Patented Oct. 26, 1948

2,452,493

UNITED STATES PATENT OFFICE 2,452,493

SILICONE RESINS FOR WELD COATINGS

Ernest Clarence Rollason, Waltham Abbey, and Ernest Horace Sebastian van Someren, Broxbourne, England, assignors to Metal & Thermit Corporation, a corporation of New York No Drawing. Application January 23, 1947, Serial No. 723,886. In Great Britain February 22, 1946

6 Claims. (Cl. 219—8)

This invention relates to flux coated electrodes for the welding of ferrous and non-ferrous metals and alloys.

It is common practice in the production of flux-coated electrodes for the metallic arc welding of metals and alloys to bind the flux with silicates of sodium and potassium. Difficulty has been experienced in obtaining thoroughly dried flux coatings when using these binders, since the soluble silicates retain an appreciable quantity of water at any drying temperature up to the melting point of the silicate and also tend to absorb water when exposed to atmospheric conditions of high humidity. Moreover these coated electrodes are unsuitable for use under water unless they are coated with a water-proofing film.

We have now found that improved results can be obtained by including in the flux coating of electrodes one or more organo-silicon polymers, otherwise referred to as silicones or silicone resins, formed by condensing hydroxy organosilanes or silanols. Where the organo group of the last-mentioned compounds is alkyl, such as methyl or ethyl, the resulting condensation product is usually known as an alkyl (methyl, ethyl, etc.) silicone resin. Alkyl silicone resins such as the methyl and ethyl silicone resins are particularly suitable. Other silicone resins may be employed, such as the aryl, alkyl aryl, and aroxy silicones.

According to the present invention therefore a welding electrode is provided with a flux coating comprising as binding agent one or more silicone condensation products.

Known binding agents may also be present in the flux coating but when maximum water resistance is desired, as for example for use under water, it is preferable to use silicone condensation products as the sole binding agents.

The use of silicone condensation products as binding agents according to the present invention, besides giving improved resistance to moisture and to deterioration in atmospheric storage, has the advantage of increasing the mechanical strength of the flux coating.

The flux coated welding electrodes may conveniently be manufactured by applying to the metal electrode by extrusion, a mixture containing the flux ingredients, one or more silanols or a partially condensed silicone, and extrusion aids or lubricants, and then heating the electrodes, with or without mechanical pressure on the surface of the coating, until condensation of the silanol, or the partially condensed silicone, is complete.

Alternatively the coating composition may be applied by dipping the metal electrode in a manner known in itself.

In the light of the foregoing description, the following is claimed:

We claim:

1. A flux coated electrode having as a binding agent in the coating an organo-silicon polymer.

2. A flux coated electrode having as a binding agent in the coating an alkyl silicone resin.

3. A flux coated electrode having as a binding agent in the coating a methyl silicone resin.

4. Method of making a flux coated electrode which comprises applying a flux and a partially condensed hydroxy organo-silane to a metal rod to coat the same, and completely condensing the hydroxy organo-silane by heating the coated rod.

5. Method of making a flux coated electrode which comprises applying a flux and a partially condensed hydroxy alkyl silane to a metal rod to coat the same, and completely condensing the hydroxy alkyl silane by heating the coated rod.

6. Method of making a flux coated electrode which comprises applying a flux and a partially condensed hydroxy methyl silane to a metal rod to coat the same and completely condensing the hydroxy methyl silane by heating the coated rod.

ERNEST CLARENCE ROLLASON.
ERNEST HORACE SEBASTIAN van SOMEREN.

REFERENCES CITED

The following references are of record in the file of this patent:

UNITED STATES PATENTS

| Number | Name | Date |
| --- | --- | --- |
| 1,663,004 | Green | Mar. 20, 1928 |
| 2,052,400 | Moritz | Aug. 25, 1936 |
| 2,107,434 | Wilson | Feb. 8, 1938 |
| 2,158,984 | Lytle et al. | May 16, 1939 |